(12) United States Patent
Mekis et al.

(10) Patent No.: US 6,915,047 B1
(45) Date of Patent: Jul. 5, 2005

(54) BROADBAND, POLARIZATION INDEPENDENT INTEGRATED OPTICAL TAP

(75) Inventors: Attila Mekis, Martinsville, NJ (US); Sergey Frolov, Berkeley Heights, NJ (US)

(73) Assignee: Inplane Photonics, Inc., So. Plainfield, NJ (US)

(*) Notice: Subject to any disclaimer, the term of this patent is extended or adjusted under 35 U.S.C. 154(b) by 41 days.

(21) Appl. No.: 10/395,872

(22) Filed: Mar. 24, 2003

(51) Int. Cl.[7] .............................. G02B 6/26; G02B 6/42
(52) U.S. Cl. ............................ 385/48; 385/14; 385/39; 385/40; 385/42
(58) Field of Search .............................. 385/45, 48, 43, 385/42, 39, 51, 31, 32, 114, 132, 12, 40, 129–131, 27–29

(56) References Cited

U.S. PATENT DOCUMENTS

| | | | | |
|---|---|---|---|---|
| 5,127,081 A | * | 6/1992 | Koren et al. | 385/130 |
| 5,276,746 A | | 1/1994 | Adar et al. | 385/27 |
| 5,375,178 A | * | 12/1994 | Van Der Tol | 385/11 |
| 5,524,156 A | * | 6/1996 | Van Der Tol | 385/28 |
| 5,539,850 A | | 7/1996 | Henry et al. | 385/48 |
| 6,463,188 B1 | * | 10/2002 | Takahashi et al. | 385/14 |
| 6,665,467 B2 | * | 12/2003 | Okayama | 385/28 |
| 6,754,417 B2 | * | 6/2004 | Nishimura et al. | 385/48 |
| 2001/0036336 A1 | * | 11/2001 | Vrieze | 385/45 |
| 2003/0133663 A1 | * | 7/2003 | Orignac et al. | 385/45 |
| 2004/0252945 A1 | * | 12/2004 | Kim et al. | 385/42 |

OTHER PUBLICATIONS

Goel, Kamal et al., "Design Considerations for Crossing Channel Switches," IEEE Journal of Quantum Electronics, vol. 25, No. 1, Jan. 1989, pp. 47–53.

E.E. Bergmann et al., "Coupling of Intersecting Ti:LiNbO$_3$ Diffused Waveguides," *Applied Optics*, vol. 23, No. 17, Sep. 1, 1984, pp. 3000–3003.

C.L.Xu et al., "A Full–Vectorial Beam Propagation Method for Anisotropic Waveguides," *Journal of Lightwave Technology*, vol. 12, No. 11, Nov. 1994, pp. 1926–1931.

* cited by examiner

*Primary Examiner*—Karl D. Frech
*Assistant Examiner*—Daniel Walsh
(74) *Attorney, Agent, or Firm*—Mayer Fortkort & Williams PC; Stuart H. Mayer, Esq.

(57) ABSTRACT

An optical tap is provided that includes an input waveguide having a first width for receiving an optical signal and a tap waveguide having a second width. The tap waveguide is coupled to the input waveguide in a junction region. An output waveguide, which has a third width, is coupled to the input waveguide in the junction region defined by the intersection of the input and tap waveguides. The input waveguide, tap waveguide and output waveguide respectively have input, tap and output longitudinal, centrally disposed optical axes. The input and tap axes define a first acute angle therebetween and the input and output axes define a second acute angle therebetween. A tapping ratio is defined by a ratio of optical output power from the tap waveguide to optical output power from the output waveguide. The tapping ratio is determined at least in part by the first, second and third widths and the first and second angles. The first, second and third widths and the first and second angles have values selected to produce a specified tapping ratio.

36 Claims, 8 Drawing Sheets

BROADBAND, POLARIZATION INDEPENDENT INTEGRATED OPTICAL TAP

FIELD OF THE INVENTION

The present invention relates to the fabrication of an optical waveguide device for tapping out a small amount of power from a light signal guided in a planar waveguide. The invention discloses a compact and low-loss optical structure that taps light out with low excess loss. The response of the optical tap structure can also be substantially independent of the wavelength and the polarization of the light signal.

BACKGROUND OF THE INVENTION

The manipulation of input and output light signals to and from optical fiber transmission lines generally requires that the signals be processed in some fashion, examples of which might include amplification, power splitting or the addition and/or dropping of signals. With the persistent trend towards miniaturization and integration, the optical circuits which best serve these processing functions are more and more being integrated on optical chips as a single module. The resulting optical circuits, which carry channel waveguides as their fundamental light-guiding elements, are generally referred to as planar lightwave circuits or PLCs. Current planar waveguide technology typically prepares a PLC by depositing a sequence of three glass films (lower cladding, core and upper cladding) on a rigid planar substrate and utilizing photolithography to pattern the required waveguide and component designs into the core layer. The refractive index of the core composition is chosen to be larger than those of the cladding layers to ensure good optical confinement within the core waveguides.

In optical networks it is necessary to monitor the level of the propagating light signal at several points in the system. As more and more functions are integrated in photonic lightwave circuits, integrated tapping devices, tapping a small fraction of the light, are needed to monitor the signal power. Although Y-branching circuits with equal power division are fundamental building blocks for optical signal processing devices, any asymmetric adaptation of this form with a branching angle large enough to achieve compactness is unable to tap out a sufficient power fraction for many applications. An optical tap representing the current art typically comprises a pair of side-by-side channel waveguides, or directional couplers, in which structure the light signal in one waveguide is evanescently coupled to the other waveguide. The fraction of light tapped-out (tap efficiency) is controlled by the distance between the two waveguides and the by the length along which they couple. Unfortunately, the optical response of a directional coupler in general depends strongly both on the polarization and wavelength of the light signal to be tapped, a characteristic that is undesirable for a versatile optical network component.

Two types of integrated optical taps have been proposed that are both polarization independent and wavelength insensitive. FIG. 1 illustrates the optical tap proposed by Henry et al. (U.S. Pat. No. 5,539,850). The invention comprises two directional couplers 101 and 102 in series in which the second coupler 102 compensates for the wavelength and polarization dependencies of the first coupler 101. The light signal is input at port 103 and most of it exits at port 104, while a small amount is tapped off to port 105. This design, however, has several disadvantages. For example, the size of such a coupler cascade is large (typically a few mms), and it also possesses an inherent loss mechanism due to light dumped from port 106 of the device. A different design for a compact integrated tap has been disclosed by Adar et al. (U.S. Pat. No. 5,276,746) and is illustrated in FIG. 2. It utilizes the guide-interaction properties of an X waveguide crossing to tap out a low level (−20 dB to −60 dB) signal. Light signal is input in port 201, passes through the X-crossing 202 and most of the light exits at port 203 while a small amount of power is tapped off to port 204. Due to symmetry, light can also be input at port 205, in which case most of the light exits at port 204 and a small amount will be tapped off to port 203. This design is also polarization independent, but the signal power fraction that can be tapped out using a crossing angle large enough to achieve device compactness is (as is the case for the Y-junction) insufficient for many applications. Moreover, the low index contrast between the cladding and the waveguide core materials, combined with the large crossing angle (>10 degrees), results in a low tap efficiency.

The mechanism of light transfer between the arms of a pair of intersecting waveguides is, at least for small crossing angles, qualitatively similar to that of a directional (i.e. evanescent) coupler with variable inter-guide separation. At the X-branch geometric crossover between two guides A and B, the incoming optical field (say in branch A) can be pictured as the sum of equal-amplitude symmetric and antisymmetric component fields in the two incoming branches. Where they begin to interact on approach to the junction, these two component fields will in general develop different velocities (and possibly different rates of attenuation). In the output branches the two fields (minus their radiative and absorption losses) can be recombined taking their relative phase shifts into account. A phase shift of $\pi/2$, for example, would cause light to be wholly transferred from A to B. More generally the degree of transfer from A to B at any point of the crossover will depend on the phase difference accumulated to that point and, for small crossing angles (with a large interaction length) the light power may alternate back and forth several times before emerging from the crossing. The final degree of transfer therefore depends on the total phase difference accumulated over the entire crossover region. In this simple picture (see, for example, Bergmann et al., *Applied Optics* 23, 3000–3003 (1984)) the fractional power transferred between the waveguides is approximately periodic in the reciprocal of the crossing angle $\theta$ with a period that depends sensitively on the magnitude of the guide refractive index contrast $\Delta n = n(\text{core}) - n(\text{cladding})$ in the crossing regime. As a result of this sensitivity, most of the current applications of waveguide crossing structures are in the field of optical switches, and are based on the use of an external (electro-optic, magneto-optic, acousto-optic or thermo-optic) stimulus to modulate $\Delta n$ in the region of the crossing.

At crossing angles larger than a degree or two the periodicity in $1/\theta$ ceases and the power-fraction transferred from the signal waveguide to the tap waveguide decreases rapidly to extremely small values at larger crossing angles. Unfortunately, this is the angular region of relevance for the formation of compact waveguide-crossing taps.

SUMMARY OF THE INVENTION

The present invention demonstrates a manner in which the X-geometry of the simple waveguide crossing can be modified to greatly increase the fractional power tapped out in the angular regime appropriate for use with compact taps. Significantly, this same modification does not increase the loss (or fractional power transfer from channeled to radiative modes) associated with the tap.

The invention is directed to an integrated optical tap comprising an input waveguide, a tap waveguide, and an output waveguide, all meeting at a common junction. The input waveguide carries a light signal, from which the tap waveguide carries away a small amount of power, while another, an output waveguide, also originating from the junction, carries away most of the power. Another, a 'blind', waveguide may originate from the junction positioned on the opposite side of the input waveguide from the tap waveguide. The offset between the center axes of the tap waveguide and the blind waveguide can be adjusted to increase both the magnitude of the tapped power and a 'figure of merit' defined by the ratio of tapped-out power to scattering (radiative) loss. A taper may be added near the intersection of any two waveguides near the junction to increase further the fractional power tapped out and to decrease scattering losses. The response of an optical tap of this kind is substantially independent of the wavelength and the polarization of the light signal propagating in the waveguide.

In accordance with one aspect of the present invention, an optical tap is provided that includes an input waveguide having a first width for receiving an optical signal and a tap waveguide having a second width. The tap waveguide is coupled to the input waveguide in a junction region. An output waveguide, which has a third width, is coupled to the input waveguide in the junction region defined by the intersection of the input and tap waveguides. The input waveguide, tap waveguide and output waveguide respectively have input, tap and output longitudinal, centrally disposed optical axes. The input and tap axes define a first acute angle therebetween and the input and output axes define a second acute angle therebetween. A tapping ratio is defined by a ratio of optical output power from the tap waveguide to optical output power from the output waveguide. The tapping ratio is determined at least in part by the first, second and third widths and the first and second angles. The first, second and third widths and the first and second angles have values selected to produce a specified tapping ratio.

In accordance with another aspect of the invention, the second acute angle is nonzero and the input axis and the output axis intersect in the junction region at a point offset from an intersection between the tap axis and the input axis in the junction region.

In accordance with another aspect of the invention, at least one of the first, second and third widths differ from the other widths.

In accordance with another aspect of the invention, the first, second and third widths are substantially equal to one another.

In accordance with another aspect of the invention, the selected values of the first, second and third widths and the first and second angles are further selected to enhance a tapping figure of merit defined by a ratio of tap efficiency to scattering loss.

In accordance with another aspect of the invention, the junction region includes at least one tapered waveguide section.

In accordance with another aspect of the invention, the optical tap also includes at least one power transfer enhancing (PTE) waveguide having a fourth width and a PTE longitudinal, centrally disposed optical axis. The PTE waveguide is coupled to the input waveguide in the junction region. The PTE waveguide couples therethrough substantially none of the optical signal. The PTE axis and the input axis define a third acute angle therebetween.

In accordance with another aspect of the invention, the PTE axis and the output axis are nonparallel.

In accordance with another aspect of the invention, the PTE axis and the input axis intersect at a point offset from the intersection of the tap axis and the input axis.

In accordance with another aspect of the invention, an optical tap is provided that includes an input waveguide having a first width for receiving an optical signal and a tap waveguide having a second width. The tap waveguide is coupled to the input waveguide in a junction region. An output waveguide, which has a third width, is coupled to the input waveguide in the junction region defined by the intersection of the input and tap waveguides. The input waveguide, tap waveguide and output waveguide respectively have input, tap and output longitudinal, centrally disposed optical axes. The input and tap axes define a first acute angle therebetween. The input and output axes define a second acute angle therebetween. The junction region includes at least one tapered waveguide section.

In accordance with another aspect of the invention, a method is provided for tapping a desired portion of optical power from an optical signal. The method begins by providing an optical tap that includes an input waveguide having a first width for receiving an optical signal, a tap waveguide having a second width and being coupled to the input waveguide in a junction region, and an output waveguide having a third width and being coupled to the input waveguide in the junction region defined by the intersection of the input and tap waveguides. The input waveguide, tap waveguide and output waveguide respectively have input, tap and output longitudinal, centrally disposed optical axes. The input and tap axes define a first acute angle therebetween and the input and output axes define a second acute angle therebetween. The method continues by directing the optical signal though the input waveguide of the optical tap. Values for each of the first, second and third widths and the first and second angles are selected to produce a specified tapping ratio that gives rise to the desired portion of optical power at an output of the tap waveguide. The tapping ratio defines a ratio of optical output power directed through a tap waveguide to optical output power directed through an output waveguide.

BRIEF DESCRIPTION OF THE DRAWINGS

FIG. 13.b Schematic cross-sectional side view of an integrated optical tap monitor.

DETAILED DESCRIPTION

It is worthy to note that any reference herein to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
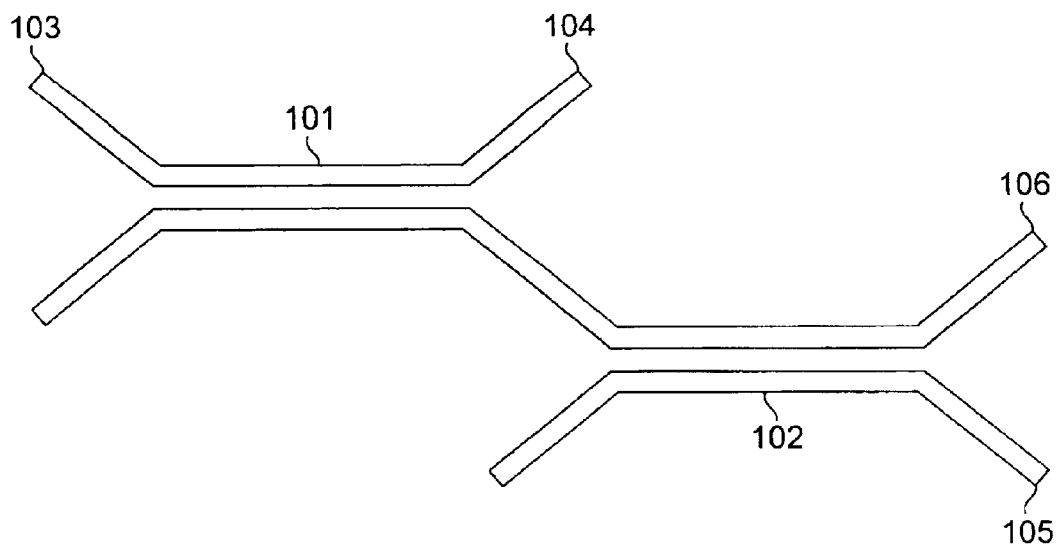
FIG. 1 Schematic of a prior art optical tap comprising two cascaded directional couplers.
Figure 2:
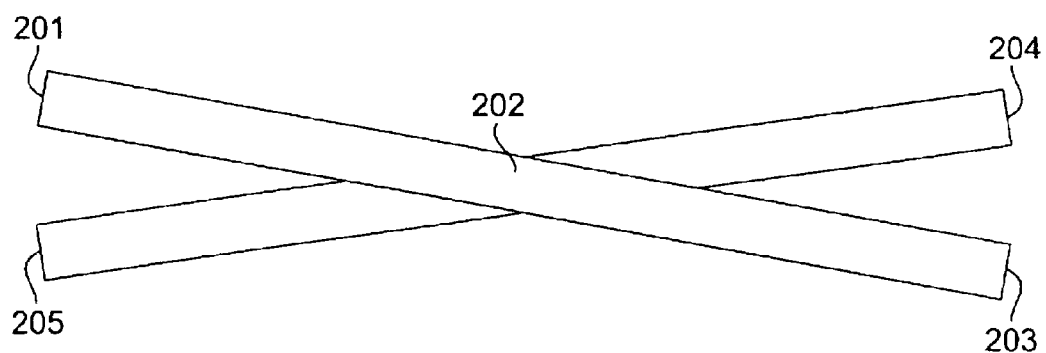
FIG. 2 Schematic of a prior art optical tap comprising a waveguide crossing.
Figure 3:
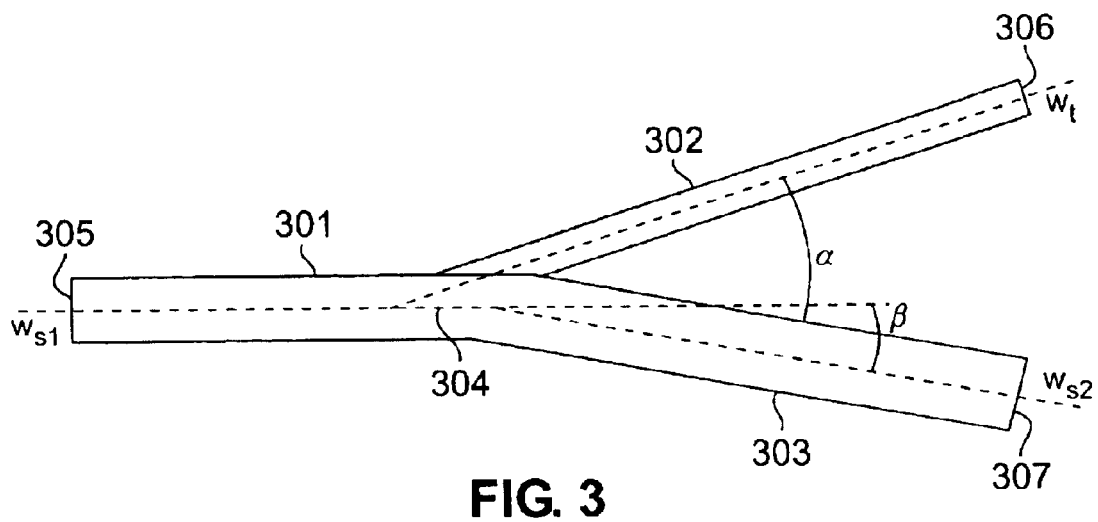
FIG. 3 Schematic of a waveguide configuration that defines the geometry of the optical waveguide tap of the present invention.

Embodiment 1 of the invention is a waveguide structure as shown in FIG. 3. The structure comprises an input waveguide 301 of width $w_{s1}$, a tap waveguide 302 of width $w_t$, and an output waveguide 303 of width $w_{s2}$. The three waveguides meet at a junction 304. We denote the acute angle enclosed by the input and the tap waveguides by $\alpha$, and the acute angle enclosed by the input and the output waveguides by $\beta$. The operation of the tap is as follows. A light signal is input at the input port 305, propagates through waveguides 301 and 303, and most of the signal power is transmitted to the output port 307. In the junction region 304, some of the signal power is transferred into the tap waveguide and travels to the tap port 306.

Figure 4:
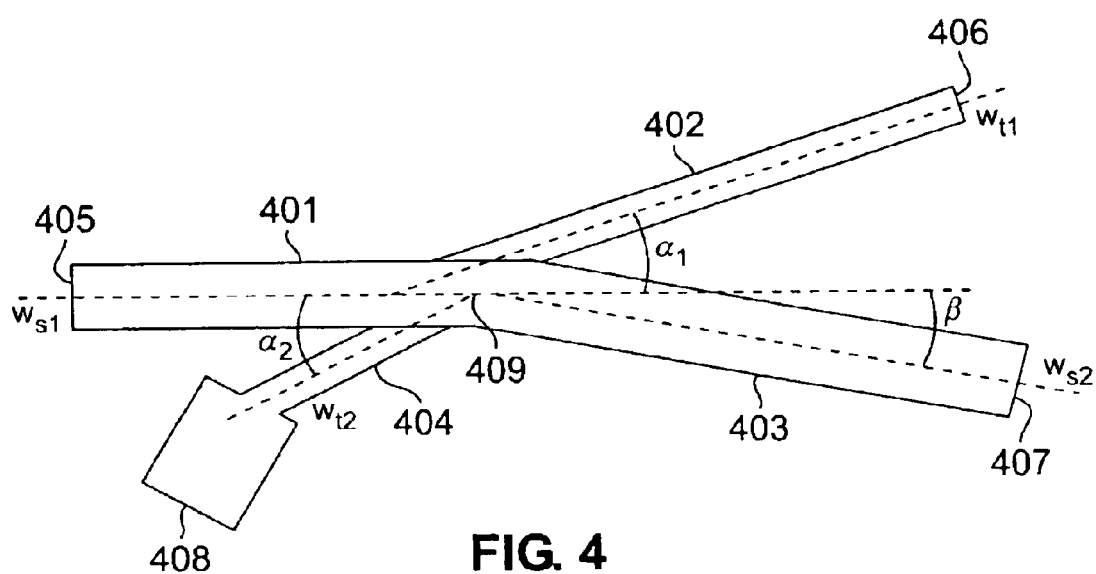
FIG. 4 Schematic of a waveguide configuration of FIG. 1 with the addition of a blind waveguide.

Embodiment 2 of the invention is a waveguide structure as shown in FIG. 4. The structure consists of input, tap and output waveguides 401, 402 and 403, with widths $w_{s1}$, $w_{t1}$, and $w_{s2}$, respectively, as in the previous embodiment. We add a blind waveguide 404 of width $w_{t2}$ to the optical tap to improve its performance. The blind waveguide is a waveguide section which couples substantially zero portion of the light signal. The blind waveguide preferably ends in a non-reflecting waveguide termination 408 so that light is not reflected from the optical tap structure should there be a light signal propagating from tap port 406 or from the output port 407. The acute angle enclosed by the input and the tap waveguides is denoted by $\alpha_1$, the acute angle enclosed by the input and the blind waveguides is denoted by $\alpha_2$, while the acute angle enclosed by the input and the output waveguides is denoted by $\beta$. The light signal enters the optical tap structure at input port 405, propagates through waveguide 401, and most of the signal power is transmitted to the output port 407. In the junction region 409, some of the signal is transferred into the tap waveguide and travels to the tap port 406. The blind waveguide aids in optimal power transfer to the tap waveguide by turning the signal wavefront towards it.

Figure 5:
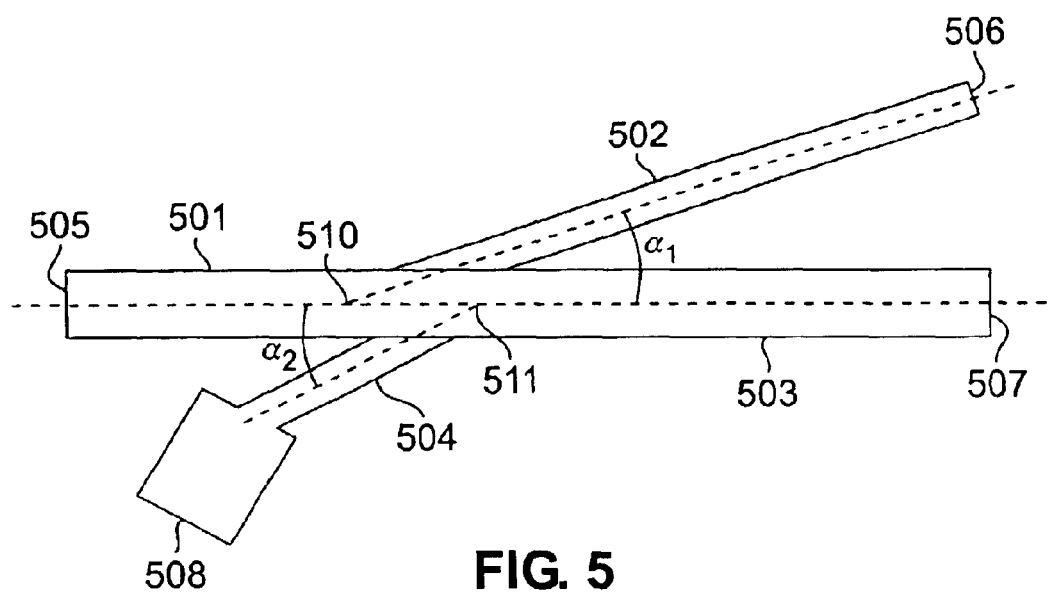
FIG. 5 Schematic of a waveguide configuration of FIG. 2 where the input and output waveguides are aligned.

Embodiment 3 of the invention is a waveguide structure as shown in FIG. 5. This embodiment is a specific case of Embodiment 2, where the angle $\beta$ is zero. In this case the blind and tap waveguides 502 and 504 are parallel to each other. The center axis of the blind waveguide 504 can be offset with respect to the center axis of the tap waveguide 502 to achieve optimal power transfer to the tap waveguide. The offset dimension is defined as the distance between the intersection 510 of the center axes of the input and tap waveguides and the intersection 511 of the center axes of the input and blind waveguides. The offset can take either positive or negative values, depending on whether the intersection 510 is closer or farther away than intersection 511 to the input port 505. Therefore if the offset is positive, as is the case in FIG. 5, the device is effectively shorter than with zero offset. More generally, a deviation of the angular ratio $\alpha_1/\alpha_2$ from unity can be added to the offset as a second optimization variable.

Figure 6:
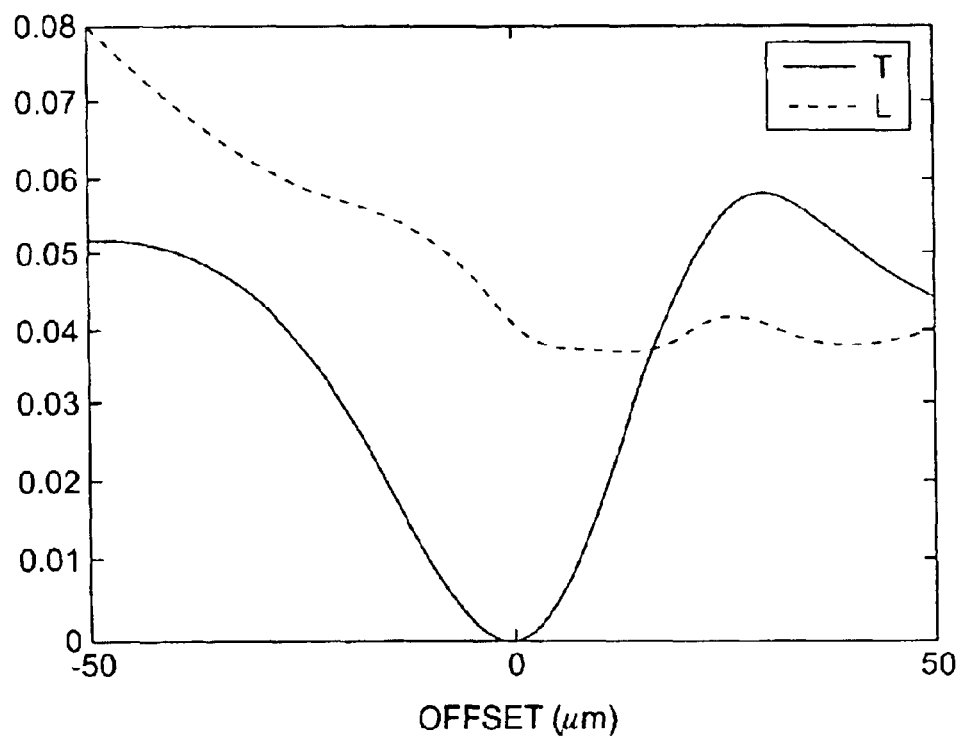
FIG. 6 A plot of the fractional power tapped T and the fractional power L lost by scattering out of the guide channels as a function of offset distance for one specific embodiment of the invention with angles $\alpha_1$ and $\alpha_2$ of FIG. 5 both equal to 8 degrees.

Embodiment 4 of the invention is a specific case of Embodiment 3, where the angles $\alpha_1$ and $\alpha_2$ are both equal to $\alpha$. The optical tap is constructed from a set of channel waveguides made of a doped silica glass of refractive index of 1.45177 embedded in a silica cladding material with a refractive index of 1.444 at 1.55 $\mu$m. The width of all waveguides is the same: $w_{s1}=w_{t1}=w_{s2}=w_{t2}=3$ $\mu$m and the angle $\alpha=8°$. Working throughout at a vacuum light wavelength of 1.55 $\mu$m, we calculate the tap efficiency T and the scattering loss L as a function of the waveguide offset using the two-dimensional beam propagation method (see for example, C.L. Xu et al., *Journal of Lightwave Technology*, 12, 1926–1931 (1994)). The quantities T and L are expressed in dimensionless form as a fraction of the power $P_i$ into the input port in the form $$T=P_t/P_i; L=[P_i-P_t-P_o]/P_i;$$

where $P_t$ and $P_o$ are respectively the powers exiting through the tap and output ports. These quantities are plotted in FIG. 6 as a function of the waveguide offset. At zero offset, where the optical tap structure is similar to a common X waveguide crossing, the tap efficiency is below 0.01%. However, if we set the waveguide offset to +30 $\mu$m, the tap efficiency increases to 5.8%. Although the tap efficiency improves by a large factor, the scattering loss does not change significantly even after the introduction of a large offset.

Figure 7:
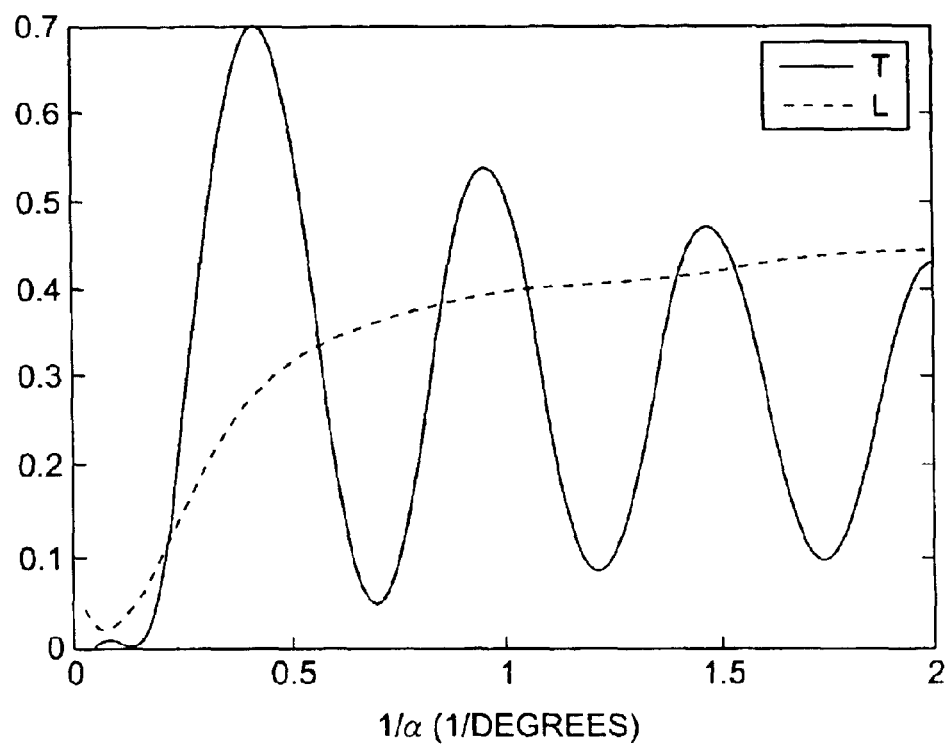
FIG. 7 A plot of tap efficiency and loss as functions of reciprocal angle $1/\alpha$ for
an embodiment of the invention where angles $\alpha_1$ and $\alpha_2$ of FIG. 5 are both equal to $\alpha$.

The response of this optical tap structure cannot be described in terms of simple coupled-mode theory as has been done for simple waveguide crossings in the prior art. To demonstrate this, in FIG. 7 we plot the tap efficiency and the scattering losses as functions of the inverse angle $1/\alpha$, for 3 $\mu$m wide waveguides with zero offset. While, for large values of $1/\alpha$ (small angles), the functional form of the tapped power is sinusoidal as predicted by coupled-mode theory, for $1/\alpha<0.15$, this periodicity clearly breaks down. In the region of larger angles, where compact optical taps are possible, the tapped power in FIG. 7 is seen to be extremely small. However, in this same regime, the tapped power is a strong function of the offset between the tap and the blind waveguides, as exemplified in FIG. 6. In this regime the physical behavior of the optical tap is more appropriately described by taking into account the full set of local guided and radiation modes. As the guided light in the input waveguide enters the junction region, the mode will couple to a large set of radiation modes in addition to the guided modes existing there. At the far end of the junction, both local guided and radiation modes combine to couple to the guided modes in the tap and the output waveguides. Finally, they also couple to radiation modes, causing the observed scattering losses.

Figure 8A:
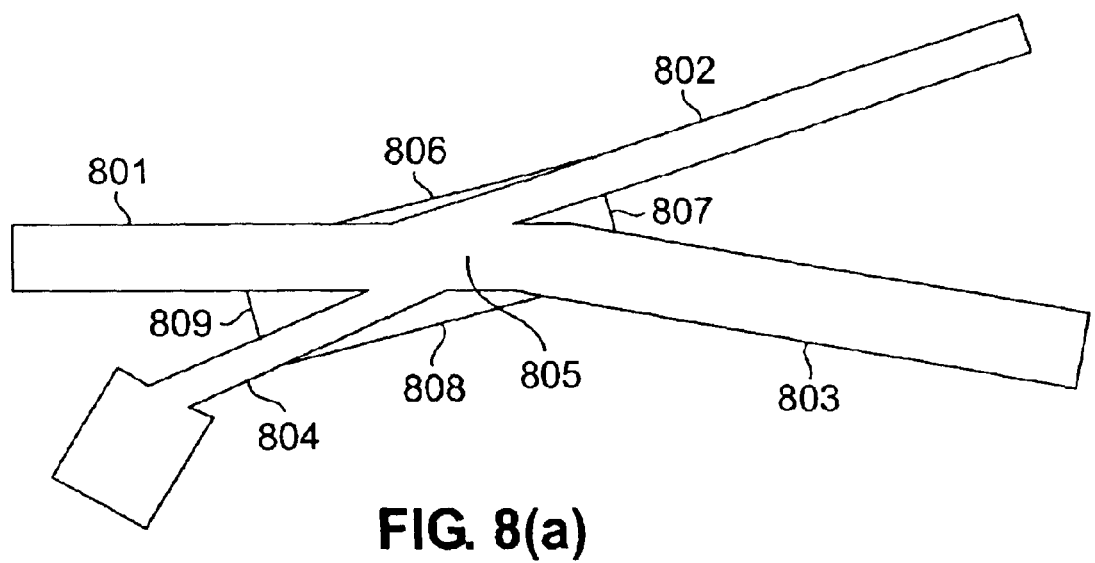
FIG. 8 Schematic of an embellishment of the optical tap configuration of a) FIG. 4 and b) FIG. 3 showing the addition of triangular tapers positioned to enhance tap performance.

Embodiment 5 of the invention is illustrated in FIG. 8a. The optical tap consists of the waveguide structure in Embodiment 2, with input, tap, output and blind waveguides 801, 802, 803 and 804, respectively. To improve the performance of the optical tap, we add a set of triangular tapers 806, 807, 808, and 809 near the waveguide junction 805. The taper can be made of the same core material as the waveguides. Tapers 806 and 808 assist in redirecting a portion of the light traveling in the input waveguide 801 into the tap waveguide 802 by turning the wavefront of the light signal towards the tap waveguide. At the same time, by effectively increasing the overall width of the waveguides near the junction, the tap enables the accommodation of more guided modes in the primary coupling regime and thus reduces scattering losses. The dimensions of the taper can be appropriately designed such that scattering losses are minimized while maintaining relatively high tap efficiency. Nothing in this embodiment is intended to imply that the geometric shape of the taper be restricted to the linear or straight edge triangular form depicted in FIG. 8. The taper can have any other functional shape without departing significantly from the spirit of the invention.

Figure 8B:
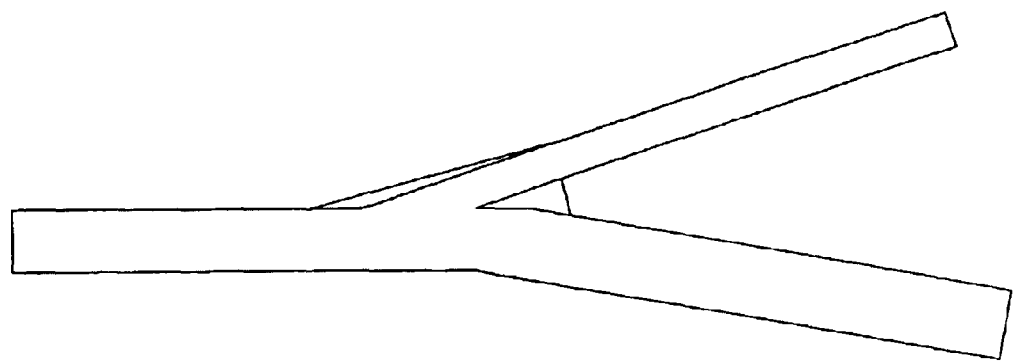

The optical tap of Embodiment 1 can also be modified in the same manner by adding tapers near the junction to improve its performance as illustrated in FIG. 8b.

Figure 9:
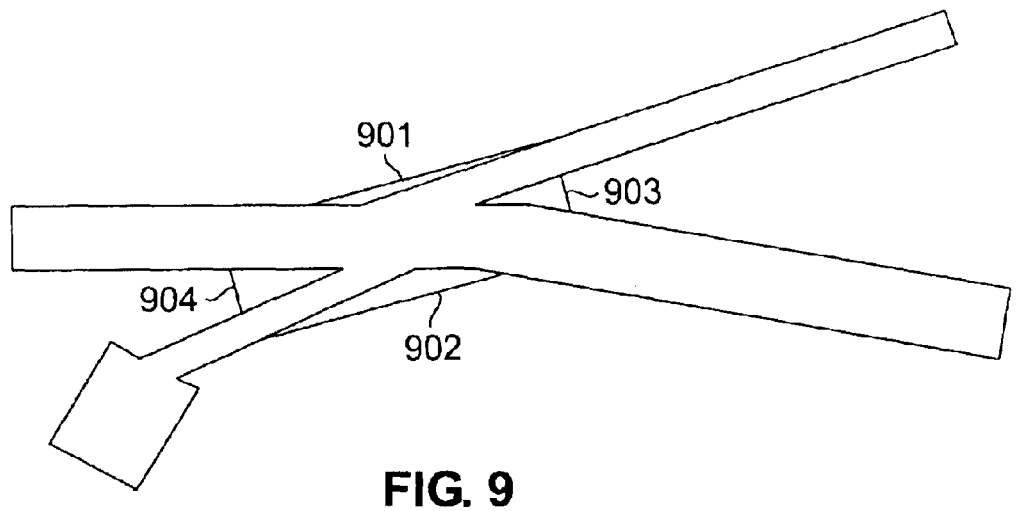
FIG. 9 Schematic of an embellishment of the optical tap configuration of FIG. 4 showing the addition of a four triangular tapers with pairwise parallel edges, positioned to enhance tap performance.

Embodiment 6 of the invention is illustrated in FIG. 9. This embodiment is a specific case of Embodiment 5, where each of the four tapers is a triangle and the two sides 901 and 902, as well as the two sides 903 and 904 are parallel.

Figure 10:
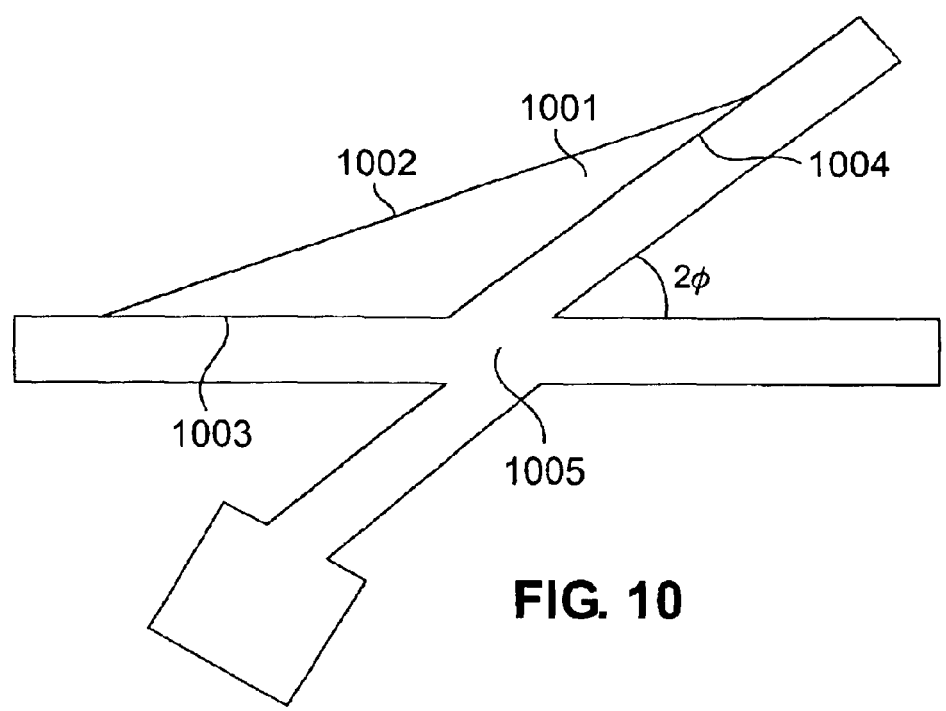
FIG. 10 Schematic of an embellishment of the optical tap configuration of FIG. 4 showing the addition of a single triangular taper positioned to enhance tap performance.

Embodiment 7 of the invention is illustrated in FIG. 10. The optical tap is a specific case of Embodiment 5, where only the taper between the input and the tap waveguides has nonzero dimensions. The taper is a triangle 1001 bounded by sides 1002, 1003 and 1004 near the junction 1005. We denote the angle enclosed by the input waveguide and the tap waveguide by $2\phi$. The dimensions of the taper can be defined with reference to FIG. 10 by the angle $\phi+\gamma$ enclosed by the sides 1002 and 1003 (with $-\phi<\gamma<\phi$ being a measure of the deviation of the taper from isosceles triangular form $\gamma=0$), and by the length H of the angular bisector of the obtuse angle opposite side 1002.

Figure 11:
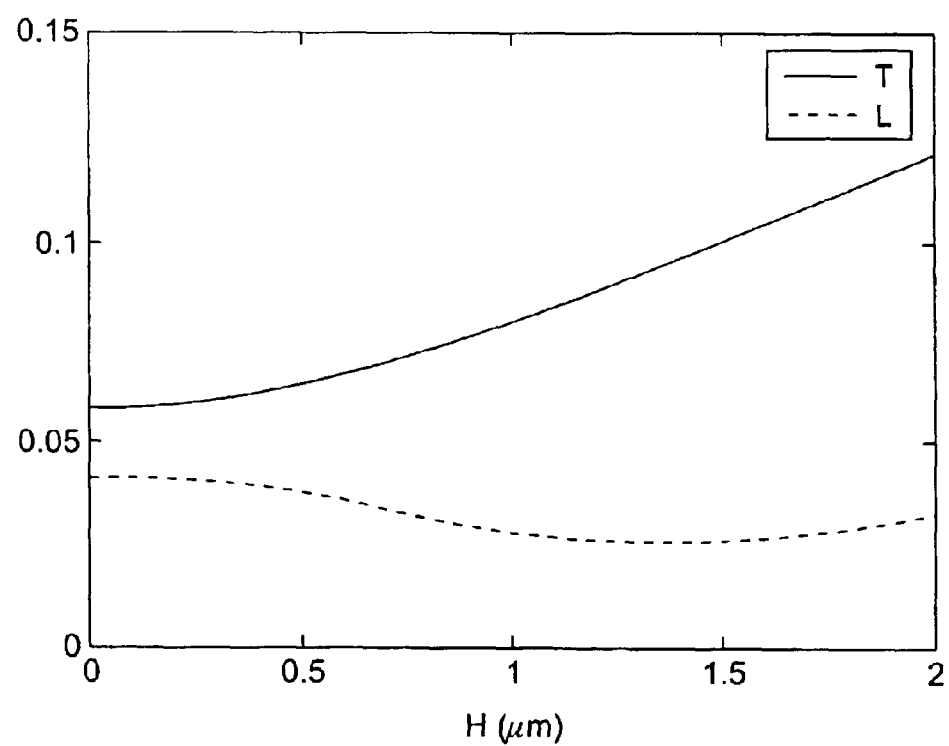
FIG. 11 A plot of tap efficiency and loss as a function of taper thickness H for an embodiment of the invention including one taper.

Embodiment 8 is a specific case of Embodiment 7, where the waveguides and the taper are constructed using the material system of Embodiment 4 with the same waveguide widths, waveguide offset and angles. We plot the response of the optical tap against H with $\gamma=-1°$ in FIG. 11. As H is increased from 0 to H=1.4 $\mu$m, the tap efficiency doubles from 5.8% to 9.4%, while at the same time the scattering loss decreases from 4.1% to 2.5%. As a cumulative measure of optimizing the waveguide offset and the taper, a figure of merit for the optical tap, defined as the ratio of the tap efficiency to the scattering loss, increased from 0.01%/4.1%≈0.0024 to 9.4%/2.5%=3.76, or more than three orders of magnitude.

Figure 12:
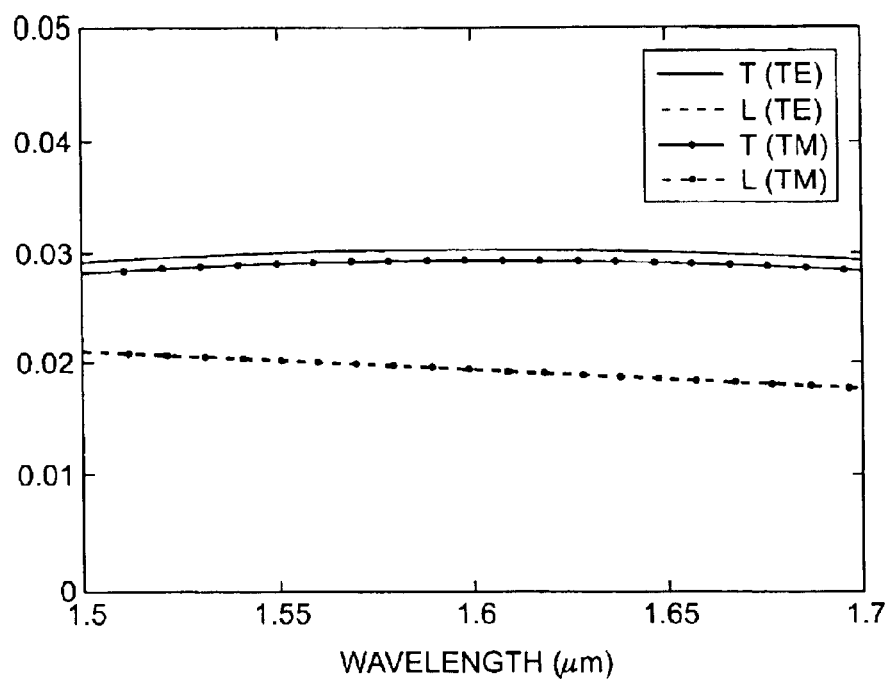
FIG. 12 A plot of tap efficiency and loss as a function of wavelength for incoming light signals with TE and TM polarization, using a specific embodiment of the invention including a taper.

Embodiment 9 of the invention is a specific case of Embodiment 7, with the following parameters. The material system is the same as in Embodiment 4, while the waveguide widths are $w_{s1}=w_{s2}=5$, $w_{t1}=w_{t2}=3$ $\mu$m, the angles are $\alpha_1=\alpha_2=10°$, $\beta=8°$, and $\gamma=0°$, the waveguide offset is +12 $\mu$m, and the height of the taper is H=1 $\mu$m. We plot the response of the optical tap as a function of wavelength both for TE and TM polarization of the incoming light signal in FIG. 12. The tap efficiency is substantially independent of wavelength in a large 200 nm wavelength range. Moreover, the response is also substantially independent of the polarization of the light signal. The difference between the tap efficiencies for TE and TM polarizations is about 0.1 dB across the entire wavelength range sampled, which is sufficiently small for most purposes.

Figure 13A:
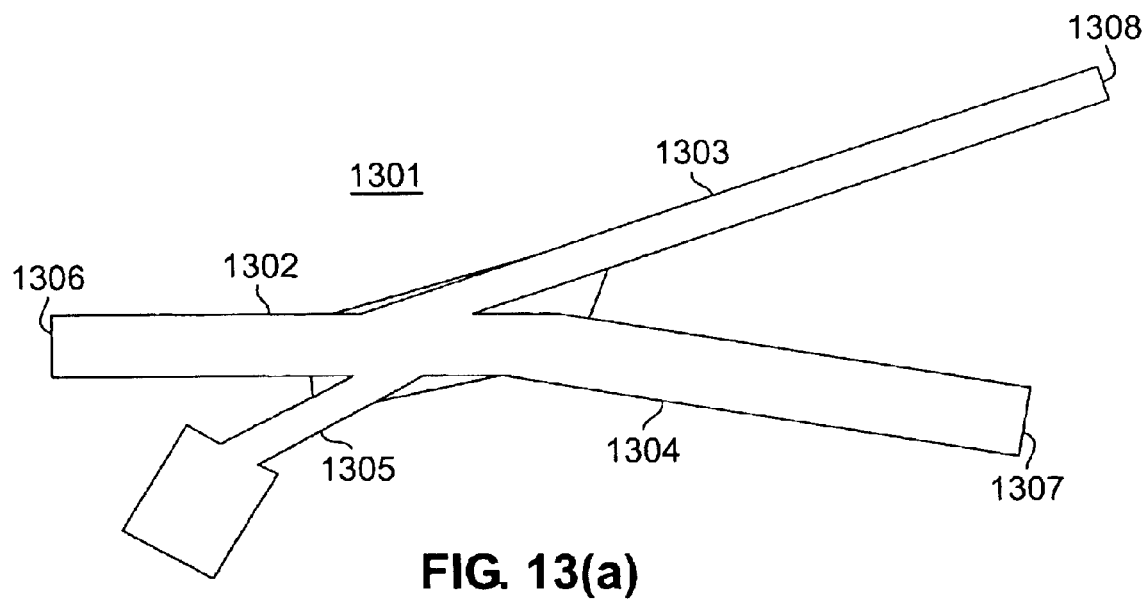
FIG. 13.a Schematic cross-sectional top view of an integrated optical tap monitor.
Figure 13B:
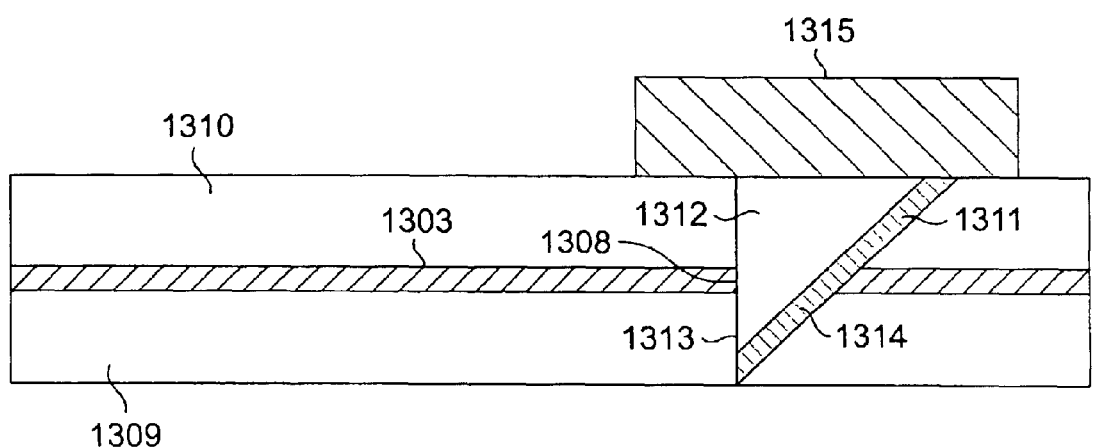

Embodiment 10 of the invention is an integrated optical tap monitor illustrated in FIG. 13. The monitor first comprises an optical tap 1301 of Embodiment 5. FIG. 13.a is a schematic cross-sectional top view of the integrated optical tap monitor in the plane of the optical tap structure 1301. With reference to FIG. 13.a, the optical tap comprises an input waveguide 1302, an output waveguide 1304, a blind waveguide 1305, and a tap waveguide 1303 ending in a waveguide termination 1308. FIG. 13.b is a schematic cross-sectional side view of the integrated optical tap monitor in the plane defined by the axis of the tap waveguide 1303. With reference to FIG. 13.b, the waveguides of the optical tap are enclosed by a lower cladding 1309 and an upper cladding 1310. The monitor further comprises a turning mirror 1311 created by first etching a wedge-like opening 1312 through the upper and lower claddings 1309 and 1310 and through the tap waveguide 1303. The opening 1312 has a first facet 1313 that vertically terminates the tap waveguide 1303 in the waveguide termination 1308 as well as a second facet 1314, angled at about 45 degrees from the plane of the waveguides. On the second facet 1314 metal comprising the turning mirror 1311 is deposited to make it reflecting. The monitor further comprises a photodiode 1315 that is mounted above the turning mirror 1311. The light signal enters the input port 1306, and most of the signal travels to output port 1307. Some of the light is tapped of by the optical tap into the tap waveguide 1303 and this tapped light signal travels to the waveguide termination 1308. The tapped light signal encounters the metallized turning mirror 1311, which reflects the signal out of the plane of the optical tap 1301 toward the photodiode 1315, where the tapped light signal is collected and detected.

What is claimed is:

1. An optical tap comprising:

an input waveguide having a first width for receiving an optical signal;

a tap waveguide having a second width and being coupled to said input waveguide in a junction region;

an output waveguide having a third width and being coupled to said input waveguide in the junction region defined by the intersection of said input and tap waveguides;

wherein said input waveguide, tap waveguide and output waveguide respectively have input, tap and output longitudinal, centrally disposed optical axes, said input and tap axes defining a first acute angle therebetween, said input and output axes defining a second acute angle therebetween;

wherein a tapping ratio defined by a ratio of optical output power from said tap waveguide to optical output power from said output waveguide is determined at least in part by said first, second and third widths and said first and second angles, said first, second and third widths and said first and second angles having values selected to produce a specified tapping ratio; and at least one power transfer enhancing (PTE) waveguide having a fourth width and a PTE longitudinal, centrally disposed optical axis, said PTE waveguide being coupled to said input waveguide in said junction region, said PTE waveguide coupling therethrough substantially none of said optical signal, said PTE axis and said input axis defining a third acute angle therebetween.

2. The optical tap of claim 1 wherein said second acute angle is nonzero and said input axis and said output axis intersect in the junction region at a point offset from an intersection between said tap axis and said input axis in the junction region.

3. The optical tap of claim 1 wherein at least one of said first, second and third widths differ from the other widths.

4. The optical tap of claim 1 wherein said first, second and third widths are substantially equal to one another.

5. The optical tap of claim 1 wherein the selected values of said first, second and third widths and said first and second angles are further selected to enhance a tapping figure of merit defined by a ratio of tap efficiency to scattering loss.

6. The optical tap of claim 1 wherein said junction region includes at least one tapered waveguide section.

7. The optical tap of claim 6 wherein said at least one tapered waveguide section extends from said input and tapping waveguides.

8. The optical tap of claim 6 wherein said at least one tapered waveguide section extends from said input and output waveguides.

9. The optical tap of claim 5 wherein said junction region includes at least one tapered waveguide section.

10. The optical tap of claim 9 wherein said at least one tapered waveguide section has dimensions that enhance said tapping figure of merit.

11. The optical tap of claim 1 wherein said second angle is substantially equal to zero.

12. The optical tap of claim 1 wherein said first and third widths are substantially equal.

13. The optical tap of claim 1 wherein said first angle is greater than about 2 degrees.

14. The optical tap of claim 1 wherein said input, tap and output waveguides are planar optical waveguides manufactured on a common planer substrate.

15. The optical tap of claim 6 further comprising at least one power transfer enhancing (PTE) waveguide having a fourth width and a PTE longitudinal, centrally disposed optical axis, said PTE waveguide being coupled to said input waveguide in said junction region, said PTE waveguide coupling therethrough substantially none of said optical signal, said PTE axis and said input axis defining a third acute angle therebetween.

16. The optical tap of claim 1 wherein said PTE axis and said output axis are nonparallel.

17. The optical tap of claim 16 wherein said PTE axis and said output axis intersect at a point offset from the input axis.

18. An optical tap comprising:
an input waveguide having a first width for receiving an optical signal;
a tap waveguide having a second width and being coupled to said input waveguide in a junction region;
an output waveguide having a third width and being coupled to said input waveguide in the junction region defined by the intersection of said input and tap waveguides, said junction region having at least one tapered waveguide section, wherein said input waveguide, tap waveguide and output waveguide respectively have input, tap and output longitudinal, centrally disposed optical axes, said input and tap axes defining a first acute angle therebetween, said input and output axes defining a second acute angle therebetween;
at least one power transfer enhancing (PTE) waveguide having a fourth width and a PTE longitudinal, centrally disposed optical axis, said PTE waveguide coupled to said input waveguide in said junction region, said PTE waveguide coupling therethrough substantially none of said optical signal, said PTE axis and said input axis defining a third acute angle therebetween.

19. The optical tap of claim 18 wherein a tapping ratio defined by a ratio of optical output power from said tap waveguide to optical output power from said output waveguide is determined at least in part by said first, second third, and fourth widths and said first, second and third angles, said first, second third, and fourth widths and said first, second and third angles having values selected to produce a specified tapping ratio.

20. The optical tap of claim 18 wherein said PTE axis and said output axis are nonparallel.

21. The optical tap of claim 18 wherein said second acute angle is nonzero and said input axis and said output axis intersect in the junction region at a point offset from an intersection between said tap axis and said input axis in the junction region.

22. The optical tap of claim 18 wherein at least one of said first, second and third widths differ from the other widths.

23. The optical tap of claim 18 wherein said first, second and third widths are substantially equal to one another.

24. The optical tap of claim 18 wherein said first, second and third widths and said first and second angles are selected to have values that enhance a tapping figure of merit defined by a ratio of tap efficiency to scattering loss.

25. The optical tap of claim 18 wherein said junction region includes at least one tapered waveguide section.

26. The optical tap of claim 25 wherein said at least one tapered waveguide section extends from said input and tapping waveguide.

27. The optical tap of claim 25 wherein said at least one tapered waveguide section extends from said input and output waveguides.

28. The optical tap of claim 24 wherein said junction region includes at least one tapered waveguide section.

29. The optical tap of claim 28 wherein said at least one tapered waveguide section has dimensions that enhance said tapping figure of merit.

30. The optical tap of claim 18 wherein said second angle is substantially equal to zero.

31. The optical tap of claim 18 wherein said first and third widths are substantially equal.

32. The optical tap of claim 18 wherein said first angle is greater than about 2 degrees.

33. The optical tap of claim 18 wherein said input, tap and output waveguides are planar optical waveguides manufactured on a common planar substrate.

34. A method for designing an optical tap having a specified tapping ratio, said tapping ratio defining a ratio of optical output power directed through a tap waveguide to optical output power directed through an output waveguide, said method comprising the steps of:
providing an input waveguide having a first width for receiving an optical signal, a tap waveguide having a second width and being coupled to said input waveguide in a junction region, and an output waveguide having a third width and being coupled to said input waveguide in the junction region defined by the intersection of said input and tap waveguides, wherein said input waveguide, tap waveguide and output waveguide respectively have input, tap and output longitudinal, centrally disposed optical axes, said input and tap axes defining a first acute angle therebetween, said input and output axes defining a second acute angle therebetween;
selecting a value for each of said first, second and third widths and said first and second angles to produce a specified tapping ratio; and
providing at least one power transfer enhancing (PTE) waveguide having a fourth width and a PTE longitudinal, centrally disposed optical axis, said PTE waveguide being coupled to said input waveguide in said junction region such that said PTE waveguide couples therethrough substantially none of the optical signal received at an input port of the input waveguide, said PTE axis and said input axis defining a third acute angle therebetween; and wherein said value selecting step includes the step of selecting an orientation for said PTE waveguide to produce the specified tapping ratio.

35. The method of claim 34 wherein the orientation selecting step includes the step of adjusting an offset between the PTE axis and tap axis to produce the specified tapping ratio.

36. The method of claim 34 further comprising the step of providing at least one tapered waveguide section extends from said junction region.

* * * * *